(12) United States Patent  
Dittrich

(10) Patent No.: US 7,689,511 B2
(45) Date of Patent: Mar. 30, 2010

(54) METHOD FOR PROVIDING MEASURED VALUES FOR END CUSTOMERS

(75) Inventor: Gerhard Dittrich, Schopfheim (DE)

(73) Assignee: Endress + Hauser GmbH + Co., Maulburg (DE)

( * ) Notice: Subject to any disclaimer, the term of this patent is extended or adjusted under 35 U.S.C. 154(b) by 2449 days.

(21) Appl. No.: 09/862,502

(22) Filed: May 23, 2001

(65) Prior Publication Data

US 2002/0040348 A1 Apr. 4, 2002

(30) Foreign Application Priority Data

Sep. 19, 2000 (DE) ................................ 100 46 350
Mar. 23, 2001 (EP) ................................ 01107314

(51) Int. Cl.
*G06F 21/00* (2006.01)
(52) U.S. Cl. ............................. 705/52; 705/50; 705/51; 705/53; 705/54; 705/55; 705/56; 705/57; 705/58; 705/59
(58) Field of Classification Search ............. 705/50–59, 705/60; 380/9
See application file for complete search history.

(56) References Cited

U.S. PATENT DOCUMENTS

| 4,415,896 | A | | 11/1983 | Allgood | |
| 4,661,914 | A | * | 4/1987 | Mulokey et al. | 700/296 |
| 5,841,360 | A | | 11/1998 | Binder | |
| 6,110,108 | A | * | 8/2000 | Shimura et al. | 600/300 |
| 6,176,826 | B1 | * | 1/2001 | Shimura et al. | 600/300 |
| 6,292,790 | B1 | * | 9/2001 | Krahn et al. | 705/50 |
| 6,535,118 | B1 | * | 3/2003 | Takagi et al. | 340/501 |
| 6,710,721 | B1 | * | 3/2004 | Holowick | 340/870.02 |
| 6,904,385 | B1 | * | 6/2005 | Budike, Jr. | 705/412 |

FOREIGN PATENT DOCUMENTS

| DE | EP 0 808 206 B1 | * | 10/1998 |
| EP | 0 993 048 A1 | * | 9/1998 |

\* cited by examiner

*Primary Examiner*—Calvin Loyd Hewitt, II
*Assistant Examiner*—Cristina Owen Sherr
(74) *Attorney, Agent, or Firm*—Bacon & Thomas, PLLC

(57) ABSTRACT

In a method for providing measured values for end customers: The measured value for a process variable is recorded using a sensor and is transmitted to a process control system. The number of transmission operations is counted on the basis of the number of transmission operations. The fundamental advantage of the invention is that the end customer no longer pays for the sensor itself, but rather only for that which he actually requires, the measured value.

15 Claims, 1 Drawing Sheet

METHOD FOR PROVIDING MEASURED VALUES FOR END CUSTOMERS

FIELD OF THE INVENTION

The invention relates to a method for providing measured values for end customers.

BACKGROUND OF THE INVENTION

In process automation, field transmitters are widely used which regulate or control process cycles in production plants.

Examples of field transmitters are level gages, which determine the level in a liquid container, pressure gages, which determine the pressure of a liquid or of a gas, e.g. in a pipeline, mass flow meters, which determine the mass flow of a liquid in a pipeline section, or valves, which regulate the flow in a pipeline section.

Field transmitters can essentially be divided into two groups, namely sensors, which determine a process variable such as level, pressure, mass flow or temperature, or actuators, which influence a process variable such as the flow in a pipeline section. One example of actuators are valves.

Generally, field transmitters are connected to a process control system by means of a data link, said process control system controlling the entire process cycle in a production plant.

Data are transmitted on this data line on the basis of the known standards, such as Hart, Profibus or Fieldbus.

The data link is used to forward the measured values supplied by a sensor to the process control system, where they are processed. The control commands from the process control system are likewise forwarded to the appropriate actuators via the data link, and said actuators then react accordingly and open or close a valve, for example.

The field transmitters are sold to the end customer, who uses them on the desired process component.

In some cases, the process components do not occupy the same space in a production plant, but instead are distributed, which means that it would be too complex to connect the field transmitters directly to a process control system, e.g. using a data bus system. Examples of such process components are distributed tanks for propellant or fuel, and lime containers for combating forest damage by acid rain, which are set up with a broad scatter in forest areas.

In this case, the data transmission to the process control system takes place by radio.

The end customer is actually interested only in the measured value supplied by the sensor. In his process control system, he requires only this value in order to be able to control the production plant.

The way in which the measured value is obtained is of no importance to the end customer. The crucial factor for the end customer is that he is provided with a reliable measured value.

Today, the end customer pays for the sensor and not for that which he actually requires, the measured value.

A faulty sensor supplies no measured values and is therefore of no use to the end customer. The end customer does not want to pay for a sensor which supplies no measured values.

Many end customers require the measured value at relatively short intervals of time; others require the measured value only relatively infrequently. However, both end customers pay the same amount for the sensor, even though they use it with different frequency.

SUMMARY OF THE INVENTION

The object of the invention is to specify a method for providing measured values for end customers which does not have the aforementioned disadvantages and, in particular, permits measured values to be provided for end customers inexpensively.

This object is achieved by a method having the following method steps.

1. A measured value for a process variable is recorded using a sensor.
2. The measured value is transmitted to a process control system.
3. The number of transmission operations is counted.
4. The costs for the end customer are calculated on the basis of the number of transmission operations.

The fundamental advantage of the invention is that the end customer no longer pays for the sensor itself, but rather only for that which he actually requires, namely the measured value.

Advantageous further developments of the invention are specified in the dependent claims.

The data transmission between sensor and process control system can take place in line-conducted fashion, e.g. using a databus system or by radio.

The number of transmission operations may be stored in the sensor or in the process control system.

In one advantageous further development of the invention, the measured values are sent to the field transmitter manufacturer over the Internet and are stored in a database. The end customer likewise accesses this database over the Internet when he requires the measured value. In this further development, the number of database access operations is counted.

In an alternative embodiment of the invention, the measured values are sent by radio, e.g. using GSM, to a provider linked to the field transmitter manufacturer. In this context, the measured values are likewise stored in a database at the field transmitter manufacturer's and can likewise be made available to the end customer on appropriate enquiry.

BRIEF DESCRIPTION OF THE DRAWINGS

The invention is explained in more detail below with the aid of a preferred exemplary embodiment shown in the drawing, in which.

DETAILED DESCRIPTION

Figure 1:
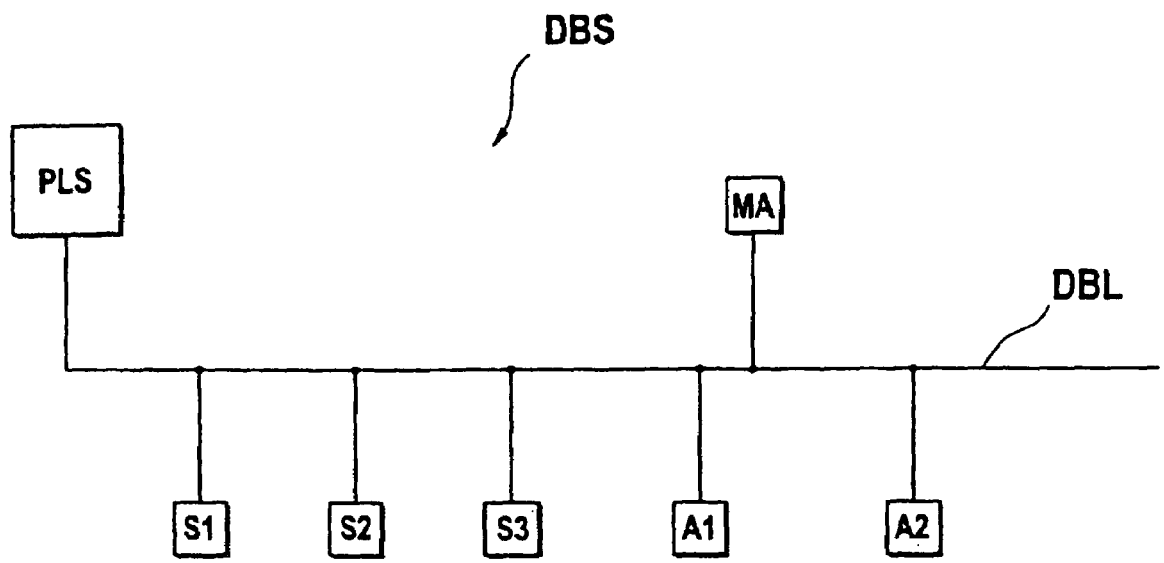
FIG. 1 shows a schematic illustration of a data bus system having a plurality of sensors which is connected to a process control system by means of a data bus.

The data bus system DBS shown in FIG. 1 comprises a plurality of data bus subscribers, namely a process control system PLS, a plurality of sensors S and a plurality of actuators A and a measured value display unit MA, which are respectively connected to one another by means of a data bus line DBL. The process control system PLS is generally arranged in a control room, from where the entire process control is effected. The sensors S and actuators A are arranged "in the field" at the location of the individual process components (tank, filling apparatus, pipeline, etc.) and are therefore also called field transmitters. The sensors S1, S2 and S3 record, by way of example, the process variables temperature T, pressure D and flow F on a particular process component. The actuators A1 and A2 are, by way of example, valve controllers regulating the flow of a liquid or of a gas through a pipeline. The data communication between the process control system PLS, the sensors S and the actuators A is effected in a known manner on the basis of an internationally standardized transmission technique (e.g. RS 485 or IEC 1158) using specific protocols (e.g. Profibus or Foundation Fieldbus).

Figure 2:
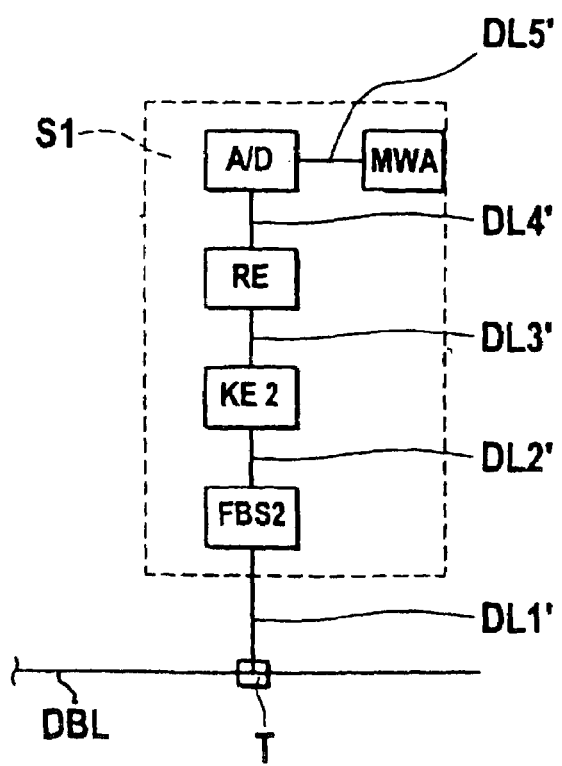
FIG. 2 shows a block diagram of a sensor.

The way in which the data communication works is explained in more detail below with the aid of the sensor S1 (FIG. 2). The sensor S1 is used to record a process variable, e.g. the temperature T of a liquid (not shown), using a measured value pick-up MWA, and the measurement signal is digitized in an A/D converter A/D as a measured value. The measured value pick-up MWA and the A/D converter A/D are connected to one another by means of a data line DL5'. The measured value is forwarded from the A/D converter A/D via a data line DL4' to a computer unit RE, where it is stored.

The computer unit RE transfers the measured value, cyclically or at the request of the process control system PLS, via a data line DL3' to a communication unit KE, which converts the measured value into a telegram which is passed to the data bus line DBL via a data line DL2' and a field bus interface FBS2.

The field bus interface FBS2 supports all send and receive functions on the basis of the transmission technique used.

The telegram contains, amongst other things, not only the digitized measured value but also information relating to the transmitter and to the receiver in the form of data bus addresses DA which uniquely identify each data bus subscriber. In this case, the telegram contains the data bus address of the temperature sensor S1 and the data bus address of the desired receiver.

If the measured value needs to be transmitted from the sensor S1 to the process control system PLS, then the receiver address which needs to be chosen is the data bus address of the process control system PLS. If the process control system PLS sends a telegram to the temperature sensor S1, then the data bus address of the temperature sensor S1 is the receiver address, and the data bus address of the process control system PLS is the sender address.

The data bus system DBS can operate on the basis of the master/slave principle, for example.

This means that the process control system PLS uses a call telegram to ask a particular sensor, e.g. the sensor S1, to pass its measured value to the data bus line DBL.

The sensor S1 responds with an appropriate response telegram containing the measured value.

This request usually takes place cyclically at particular intervals of time.

In the case of a data bus system operating on the basis of another principle, the sensors S pass their measured values to the data bus line DBL automatically at certain intervals of time (cyclically).

The computer unit RE counts the number AZ of transmissions of the measured values and stores it in a data memory integrated in the computer unit.

Alternatively, the number AZ of transmissions of the measured values may also be counted in the process control system PLS and stored in a corresponding data memory. However, in each case, there must be no scope for manipulation of the number AZ of transmissions of the measured values.

The method according to the invention is explained in more detail below.

In a first method step, the measured value for a process variable, e.g. temperature, pressure or flow, is recorded using a sensor S, e.g. S1, S2 or S3.

In a second method step, the measured value is transmitted to the process control system PLS. The transmission can be performed either on the basis of a request from the process control system PLS or cyclically by the sensor S.

In a third method step, the number AZ of transmission operations is counted. In a fourth method step, the costs for the end customer are calculated on the basis of the number AZ of transmission operations.

This method provides a simple way of billing the use of the sensor S. The end customer no longer pays for the sensor S, but rather for the number AZ of measured values which he obtains from the sensor S. The field transmitter manufacturer provides the end customer with measured values inexpensively.

The method according to the invention is not limited to line-based data bus systems, but rather may also be used for radio transmission. In this case, the sensor is connected to the process control system by radio. The measured values are sent to the process control system by radio in this context.

Radio transmission is advantageous in the case of widely scattered process components, where there is no worth in a line-based link to the process control system.

Examples of such process components are tanks for propellant or fuel, or lime containers, as are used for combating forest damage by acid rain.

In the case of radio transmission, the number AZ of measured values transmitted to the process control system by radio is counted.

Recently, measured values are also transmitted over the Internet from sensors to process control systems on end customers' premises. In this case, the transmission operations can easily be counted with protection from manipulation. In this context, the measured values are not sent directly from the sensor to the end customer's process control system, but rather via the field transmitter manufacturer. For this purpose, the field transmitter manufacturer provides a database to which the end customer has access. The sensor first transmits the measured value over the Internet to the field transmitter manufacturer, where it is stored in a database. If the end customer requires the measured value, then he retrieves it from the database, likewise over the Internet.

In one alternative embodiment of the invention, the measured values are sent to the field transmitter manufacturer by radio, e.g. using GSM. In this case, the measured values are likewise stored in a database at the field transmitter manufacturer's and may be provided to the end customer on appropriate request, e.g. over the Internet.

The invention claimed is:

1. A method for providing measured values for end customers, comprising the steps of:
    recording a process variable by a measured value pick-up device wherein the device, a converter, a computer unit and a communication unit are part of a sensor;
    digitizing the process variable into a measured value by the converter connected to the device via a first data line;
    transmitting the measured value from the converter to the computer unit;
    transmitting the measured value from the computer unit to the communication unit over a second data link;
    receiving by the sensor a request for the measured unit from a process control unit;
    converting the measured value by the communication unit into a telegram and transmitting the telegram from the sensor to the process control unit wherein the telegram comprises the measured value, data bus address of the sensor S and a data bus address of the process control system; and counting and storing the number of measured values transmitted from the sensor to the process control unit by the computer unit.

2. The method as defined in claim 1, wherein the transmitting steps between the sensor and the process control system are conducted over a data bus system DBS.

3. The method as defined in claim 1, wherein the transmitting steps between the sensor and the process control system are conducted by radio.

4. The method as defined in claim 1, further comprising the step of storing the number of measured values transmitted in the process control system.

5. The method as defined in claim 2, further comprising the step of storing the number of measured values transmitted in the process control system.

6. The method as defined in claim 1, further comprising the step of transmitting the number of measured values over the internet from the sensor to a database at a field transmitter manufacturer.

7. The method as defined in claim 2 further comprising the step of transmitting the number of measured values over the internet from the sensor to a database at a field transmitter manufacturer.

8. The method as defined in claim 3, further comprising the step of transmitting the number of measured values over the internet from the sensor to a database at a field transmitter manufacturer.

9. The method as defined in claim 1, further comprising the step of transmitting the number of measured values over the internet from the sensor to a database at a field transmitter manufacturer.

10. The method as defined in claim 2, further comprising the step of transmitting the number of measured values over the internet from the sensor to a database at a field transmitter manufacturer.

11. The method as defined in claim 1, further comprising the step of transmitting the number of measured values over radio from the sensor to a database at a field transmitter manufacturer.

12. The method as defined in claim 2, further comprising the step of transmitting the number of measured values over radio from the sensor to a database at a field transmitter manufacturer.

13. The method as defined in claim 3, further comprising the step of transmitting the number of measured values over radio from the sensor to a database at a field transmitter manufacturer.

14. The method as defined in claim 1, further comprising the step of transmitting the number of measured values over radio from the sensor to a database at a field transmitter manufacturer.

15. The method as defined in claim 2, further comprising the step of transmitting the number of measured values over radio from the sensor to a database at a field transmitter manufacturer.

* * * * *